United States Patent [19]

Milankov et al.

[11] Patent Number: 4,982,577

[45] Date of Patent: Jan. 8, 1991

[54] CRYOGENIC APPARATUS

[75] Inventors: Bosko Milankov, Mississauga; John K. Irvine, Etobicoke, both of Canada

[73] Assignee: I.Q.F. Inc., Mississauga, Canada

[21] Appl. No.: 495,633

[22] Filed: Mar. 19, 1990

[51] Int. Cl.$^5$ .............................................. F25D 25/02
[52] U.S. Cl. ......................................... 62/381; 62/375
[58] Field of Search ..................... 62/381, 374, 375, 63

[56] References Cited

U.S. PATENT DOCUMENTS

| | | | |
|---|---|---|---|
| 3,412,573 | 11/1968 | Pauliukonis | 62/381 |
| 3,992,899 | 11/1976 | Spahn | 62/381 |
| 4,033,142 | 7/1977 | Schorsch et al. | 62/381 |
| 4,761,962 | 8/1988 | Andersson | 62/381 |

*Primary Examiner*—Ronald C. Capossela
*Attorney, Agent, or Firm*—Donald E. Hewson

[57] ABSTRACT

A cryogenic apparatus for quickly freezing droplets of liquid product is disclosed. This apparatus employs cryogenic liquid, typically liquid nitrogen, flowing along a ramp or sluiceway to freeze a product. The product is kept in the cryogenic liquid for a relatively constant dwell time. The ramp or sluiceway is contained within an insulated vessel to preclude the cryogenic liquid from evaporating and to retain any spillage. The ramp or sluiceway is preferably spiral shape so as to allow for a maximum length run with the insulated vessel.

11 Claims, 1 Drawing Sheet

4,982,577

CRYOGENIC APPARATUS

BACKGROUND OF THE INVENTION (a) Field of Invention

This invention relates to cryogenic apparatus for freezing a liquid product into pellets, and more particularly to cryogenic apparatus having a controlled dwell time such that the product to be frozen is in contact with the freezant for a controlled period of time. Additionally, the invention provides a more efficient means of using a freezant such that less of the freezant is lost during the process.

(b) Background of Invention

It has long been known that in order to deep freeze something quickly it could be introduced into a coolant such as liquid nitrogen, which is typically at a temperature of around minus 300 degrees F. There are a number of problems, however, associated with introducing a liquid product into the liquid nitrogen for freezing.

The product that ultimately emerges is frozen very quickly to a very low temperature, depending on the dwell time—the time that it remains in the liquid nitrogen. It is desirable that the temperature of the frozen product that is removed from the liquid nitrogen be fairly constant such that no more heat than necessary is absorbed into the liquid nitrogen. This is necessary for the sake of efficiency, since liquid nitrogen is very expensive. In many types of cryogenic apparatus, the product becomes suspended in liquid nitrogen in a relatively uncontrolled manner. The dwell time of the various pieces of product can vary a great deal. This can cause a temperature difference of up to 100° F. between different pieces of the product at the time they are removed from the liquid nitrogen.

Once the liquid product is frozen to a very low temperature, however, it is quite acceptable to have the frozen product to come up to a higher temperature as long as the product remains frozen.

It is also generally desirable that the frozen product be of a fairly consistent size when it is frozen. This is for two reasons. Firstly, a relatively consistent size product is produced and it is easier to work with. Working with a relatively consistent size product is highly advantageous in various industries no matter what the type of frozen end product being used. Industries such as bakeries, drug manufacturers, processed food producers, and the like, need to measure fairly exact quantities of frozen product. This is more easily done if the pellets of frozen product are of relatively consistent size, especially where automated measuring machines are used. More exact measurement of frozen product provides for a more controlled means of producing a more consistent quality end product. Furthermore, a more consistent size frozen product will thaw at a more consistent rate, thus producing a better quality end product. Secondly, as mentioned above, this allows all of the pellets or particles to be frozen about the same amount. If particles are indeed smaller, they will be frozen more deeply, which is a waste of liquid nitrogen.

Another problem with entering liquid product into a bath of liquid nitrogen is that the liquid nitrogen typically boils fairly violently at the surface. This means there is a fair degree of bubbling at the surface which would tend to splash the liquid nitrogen at the liquid product as it is being dropped into the liquid nitrogen. This tends to break up the product and thus small droplets of varying size of the liquid product would be entering the liquid nitrogen, and subsequently different size pellets would be formed. Furthermore, it would not be possible to have a nozzle immediately above the surface of the nitrogen since the low temperature of the nitrogen would freeze the product as it was coming out of the nozzle, thereby plugging up the nozzle. The nozzle would, therefore, have to be a suitable height above the surface.

If the product was pumped or ejected out of the nozzle with sufficient force so as to preclude the product from freezing in the nozzle, then it would be possible to have the nozzles closer to the surface of the liquid nitrogen.

Typically, it has also been found that creating movement or flow within the liquid nitrogen, precludes a large degree of the surface bubbling that is typically encountered. Such movement can be caused by impellers, paddles, or jets.

One way to improve the efficiency of a cryogenic apparatus such that the dwell time is fairly constant, thereby making the whole process more efficient in terms of not wasting liquid nitrogen, is to introduce the product into a moving volume of liquid nitrogen for a controlled period of time. This can be accomplished by having liquid nitrogen flow at a relatively constant rate along a downwardly sloping ramp or sluiceway, where it can flow until it reaches a reservoir. The amount of time taken for the liquid nitrogen to travel the ramp or sluiceway is fairly constant, and controllable depending on the length and slope of the ramp or sluiceway. It is, therefore, possible to control the dwell time of the liquid product in the nitrogen by introducing the product onto the sluiceway at a given point, and removing the frozen product at a given point.

Introduction of the product is done basically in the same manner as introducing such product to a reservoir of liquid nitrogen for freezing—the product is dropped from one or more nozzles. The movement of the liquid nitrogen flow on the ramp or sluiceway largely precludes the boiling action of the liquid nitrogen that typically interferes with proper operation of the nozzle or nozzles.

More importantly, it is possible to channel the flow of liquid nitrogen, since it is in a ramp or sluiceway, into a means for separating the frozen product from the liquid nitrogen. Such means can be a fairly simple screen that catches the product, removes it from the flow of liquid nitrogen and transports it to a holding bin. The liquid nitrogen would obviously pass through the screen, and ultimately be returned to the reservoir of liquid nitrogen.

There are problems associated with the apparatus as described above in that there is a greater amount of liquid nitrogen exposed to the air than necessary, which allows for greater evaporation of the liquid nitrogen. Furthermore, the movement and general agitation of the liquid nitrogen will also cause greater evaporation. Since liquid nitrogen is quite expensive, it is undesirable to have any more evaporation of liquid nitrogen than is necessary.

DESCRIPTION OF THE PRIOR ART

In Canadian Pat. No. 1,217,351 assigned to the assignee hereof, an apparatus is shown that includes a trough containing liquid nitrogen at a depth of two or three centimeters, and flowing at a speed of about 0.1 to 0.5 meters per second.

A substantially liquid product is introduced to the liquid nitrogen flow, generally somewhere around the top portion of the trough. The liquid nitrogen and product being carried therein flow down the trough together. The liquid product is frozen while in the liquid nitrogen and is subsequently removed therefrom by a screen at the bottom of the trough. The liquid nitrogen is then returned to a reservoir via a return trough.

There is one problem associated with this apparatus, however, in that while it does allow for a fairly constant dwell time for the product to be frozen, it unfortunately is somewhat inefficient in nitrogen use by virtue of the fact that the liquid nitrogen travels outside of the reservoir for quite a distance and quite a length of time. During this time, a great deal of surface area of the liquid nitrogen is exposed to the air thereby allowing for execessive evaporation and loss to take place.

SUMMARY OF THE INVENTION

The present invention provides a cryogenic apparatus that allows for a generally constant dwell time of liquid product in a cryogenic liquid, typically liquid nitrogen, through the use of a sluiceway. Furthermore, the ramp or sluiceway is contained over the reservoir of cryogenic liquid such that any spillage of cryogenic liquid is recovered. More importantly, the separating means for separating the frozen product from the cryogenic liquid is also located over the reservoir of cryogenic liquid. This means that any cryogenic liquid spilled during the separation step will fall back into the cryogenic liquid reservoir. Furthermore, there is no need for a return ramp for returning the cryogenic liquid from the separating means to the cryogenic liquid reservoir.

The ramp or sluiceway is contained within an insulated vessel, thereby keeping the whole process better insulated from the ambient surroundings. This in turn keeps the entire space surrounding the cryogenic liquid colder, thus causing less evaporation of the cryogenic liquid.

BRIEF DESCRIPTION OF THE DRAWINGS

Embodiments of this invention will now be described by way of example in association with the accompanying drawing, in which the single

DETAILED DESCRIPTION OF THE PREFERRED EMBODIMENTS

Figure 1:
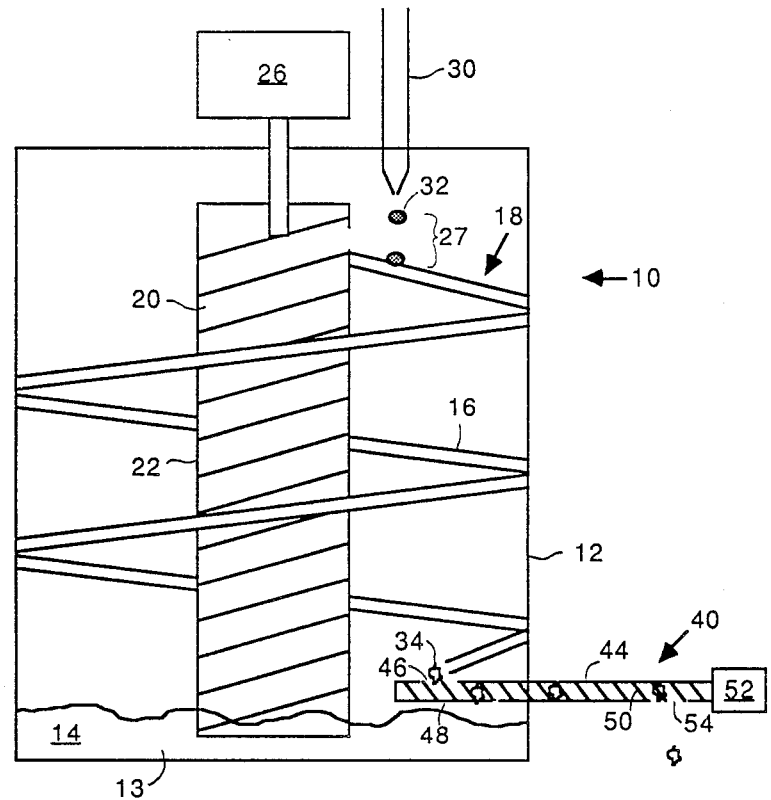
FIG. 1 is a partially cut away front view of the apparatus.

Reference will now be made to FIG. 1 which shows the improved cryogenic apparatus 10 during typical operation. The apparatus is generally encompassed by an insulated vessel 12. The insulated vessel 12 is adapted to receive and retain a reservoir 13 of cryogenic liquid 14, typically liquid nitrogen.

The insulated vessel 12 is generally closed by a lid (not shown) but may be opened at the top to generally allow access thereto, especially for cleaning and inspection purposes. Inclusion of the lid provides for better overall insulation. Generally, there may be an opening in the lid to allow for entry of any product to be frozen, thus allowing the lid to remain in place during operation.

Insulated vessel 12 is also adapted to retain and support spiral sluiceway 16 therein. The spiral sluiceway 16 starts at or near the top of the insulated vessel 12 and continues downwardly, preferably at a virtually constant slope to the bottom area of the insulated vessel 12. It is also preferably of a constant radius and located at the perimeter of the insulated vessel 12. This allows a maximum length run to be obtained for a given slope. The spiral sluiceway 16 terminates above the reservoir 13 of cryogenic liquid 14. The spiral sluiceway 16 carries a flow of cryogenic liquid 18 down the spiral sluiceway 16 at a relatively constant speed from the top portion of the insulated vessel 12 where the liquid 14 is introduced, down into the reservoir 13.

The cryogenic liquid 14 is taken from the reservoir by a screw pump 20, which is enclosed by an inner cylinder 22 in order to contain the cryogenic liquid 14 as it is raised by the screw pump 20. The inner cylinder 22 and enclosed screw pump 20 are preferably generally centrally located within the insulated vessel 12. At or near the top portion of inner cylinder 22, there is an opening 24 that is adapted to allow cryogenic liquid 14 to flow outwardly from inner cylinder 22 and onto the top portion of spiral sluiceway 16. The top portion of spiral sluiceway 16 is indeed more curved than the rest of the sluiceway such that it reaches inwardly to the centrally located inner cylinder 22.

The screw pump 20 is rotated by motor 26, which is shown located externally to the insulated vessel 12. Alternatively, the motor 26 may be contained somewhere within the insulated vessel 12 or even beneath. It is preferably located above for purposes of easy access. The speed of the rotation of the screw pump may be controlled by controlling the speed of the motor 26, thereby controlling the rate at which the cryogenic fluid 14 is raised from the reservoir 13 and deposited onto the spiral sluiceway 16.

In order to introduce a liquid product to the cryogenic liquid so it may be frozen, the liquid product 27 is expelled from a nozzle 30, or alternatively a plurality of nozzles, in small fairly consistent size droplets 32. The nozzle 30 must be located slightly above the spiral sluiceway 16 in order to preclude the cryogenic liquid from splashing thereon and thereby cooling the nozzle 30 down sufficiently to freeze the liquid product 27 while still in the end of the nozzle 30.

As the droplets 32 of liquid product 27 reach the top portion of the spiral sluiceway 16, they are introduced to the flow of cryogenic liquid 18 on the spiral sluiceway 16. A temperature difference between the liquid product 27 and the flow of cryogenic liquid 18 may be in the order of 300 degrees Fahrenheit, but the liquid product 27 is frozen quickly into pellets 34. The pellets 34 become more and more frozen as they continue along the spiral sluiceway 16 along with the flow of cryogenic liquid 18. When the pellets 34 reach the bottom portion of the spiral sluiceway 16, they encounter a product/liquid separator 40 which allows the cryogenic liquid 14 to pass into the reservoir 13 but traps the frozen pellets 34 for removal from the insulated vessel 12. The product/liquid separator 40 is preferably a screen that allows the cryogenic liquid 14 to pass there through.

When the pellets 34 reach the end of the spiral sluiceway 16 they enter an extraction tube 44 through first opening 46. The extraction tube 44 preferably passes through insulated vessel 12 in order that the pellets 34 can be removed there from. It is also possible that the extraction tube 44 is oriented upwardly such that it passes out the open top end of the insulated vessel 12. The extraction tube 44 and the insulated vessel 12 are in sealed relation one to the other so that cryogenic liquid is precluded from passing there between and escaping from insulated vessel 12.

The flow of cryogenic liquid 18 also enters the extraction tube 44 through first opening 46 where it is allowed to exit from by following through a screen 48, and return to reservoir 14. The pellets 34 are stopped by the screen 48 and are drawn up extraction tube 44 by extraction screw 50, which is rotated by motor 52. Pellets 34 exit extraction tube 44 through a second opening 54, where they are collected in an appropriate container.

Contemplated in an alternative embodiment is a sluiceway of a varying slope, such that said slope is more severe near the top of said sluiceway and gradually reduces to a less severe slope. Furthermore, the less severe slope would preferably be substantially constant. In a further alternative embodiment, it is contemplated that the dispensing means is movable wih respect to said sluiceway so as to allow for a varying dwell time of the product on said sluiceway.

In another alternative embodiment, it is contemplated that the insulated vessel is of a rectangular shape and the sluiceway is in the form of a switchback.

Other modifications and alterations may be used in the design and manufacture of the cryogenic apparatus of the present invention without departing from the spirit and scope of the accompanying claims.

What is claimed is:

1. An improved cryogenic device, comprising:
   an insulated vessel having an outer shell adapted to contain cryogenic liquid;
   a reservoir of cryogenic liquid contained in said insulated vessel;
   means for dispensing liquid product to be frozen into solid product granules;
   a downwardly sloping sluiceway adapted to receive a flow of cryogenic liquid near the top of said sluiceway, and also adapted to receive said liquid product from said dispensing means into the flow of cryogenic liquid, with said sluiceway being located above said reservoir within said vessel;
   said flow of cryogenic liquid being adapted to carry said liquid product along said sluiceway and to quickly freeze said liquid product into a solid product in granular form;
   separator means adapted to receive the flow of cryogenic liquid and solid product granules from said sluiceway, to separate said product granules from cryogenic liquid, to retain said solid product granules for subsequent extraction and to pass said cryogenic liquid;
   wherein said separator means is directly above and in close proximity to said reservoir such that the length of said flow of cryogenic liquid after it is separated from said solid product granules is minimized;
   pump means for transporting said cryogenic liquid from said reservoir and introducing it to said sluiceway via a guide means; and
   extraction means operating in co-operation with said seperator means for moving said solid product granules from said vessel.

2. The improved cryogenic apparatus of claim 1, wherein said sluiceway is of a spiral shape and said vessel is cylindrical in order to accommodate said spiral sluiceway.

3. The improved cryogenic apparatus of claim 2, wherein said sluiceway is of a substantially constant slope.

4. The improved cryogenic apparatus of claim 1, wherein said sluiceway is of a varying slope, such that said slope is more severe near the top of said sluiceway and gradually reduces to a less severe slope.

5. The improved cryogenic apparatus of claim 4, wherein said less severe slope is substantially constant.

6. The improved cryogenic apparatus of claim 1, wherein said pump means is a screw pump, and is located centrally within said insulated vessel, inside an inner cylinder.

7. The improved cryogenic apparatus of claim 1, wherein said seperator means comprises a mesh screen adapted to receive and retain said solid product granules, and to pass said cryogenic liquid.

8. The improved cryogenic apparatus of claim 1, wherein said extraction means comprises a rotating screw thread adapted to remove said solid product granules from said seperator means, and to deposit said solid product granules into a container.

9. The improved cryogenic apparatus of claims 1 and 8, wherein said insulated vessel is adapted to allow said extractor means to pass therethrough and to allow said solid product granules to be removed therethrough.

10. The improved cryogenic apparatus of claim 1, wherein said dispensing means is movable wih respect to said sluiceway so as to allow for a varying dwell time of the product on said sluiceway.

11. The improved cryogenic apparatus of claim 1, wherein said sluiceway is of a rectangular shape and said vessel is in the form of a switchback in order to accommodate said spiral sluiceway.

* * * * *